Apr. 24, 1923.
S. C. HULICK
CAMP COOKER
Filed May 6, 1922
1,452,640
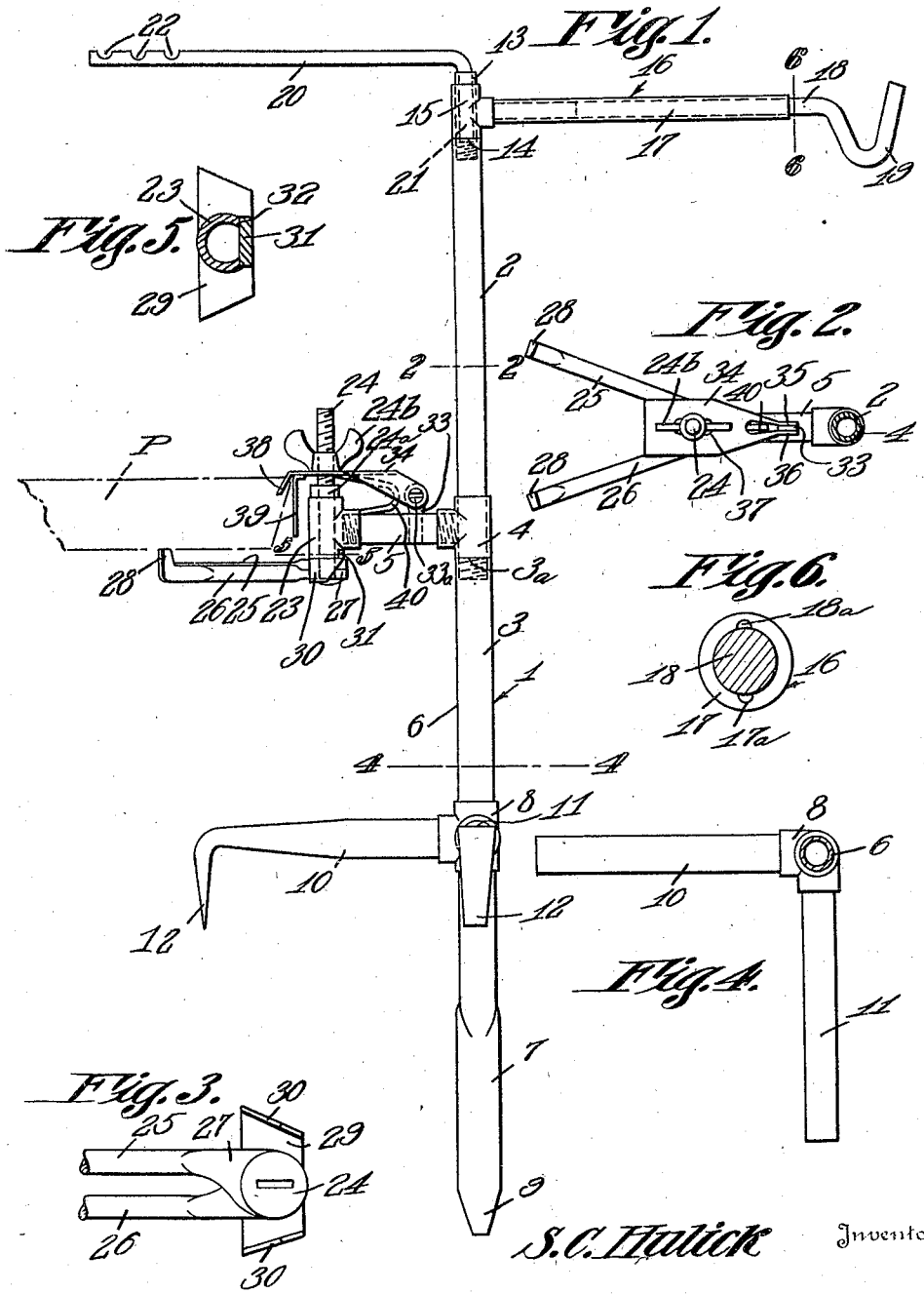

Patented Apr. 24, 1923.

1,452,640

UNITED STATES PATENT OFFICE.

SAMUEL C. HULICK, OF SPOKANE, WASHINGTON.

CAMP COOKER.

Application filed May 6, 1922. Serial No. 558,949.

*To all whom it may concern:*

Be it known that I, SAMUEL C. HULICK, a citizen of the United States, residing at Spokane, in the county of Spokane and State of Washington, have invented a new and useful Camp Cooker, of which the following is a specification.

This invention relates to portable camp stoves or cookers.

The object of the invention is to provide a cooker of this character constructed so as to support cooking vessels of different kinds and various sizes.

Another object is to provide a cooker of this character having simple and efficient means for securely holding a frying pan or spider in position over the fire and which is swingable horizontally to vary its position.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of a cooker constructed in accordance with this invention with a portion of a frying pan shown supported thereon.

Fig. 2 is a horizontal section taken on the line 2—2 of Fig. 1.

Fig. 3 is a detail bottom plan view of the pan holder.

Fig. 4 is a horizontal section taken on the line 4—4 of Fig. 1.

Fig. 5 is a detail section taken on the line 5—5 of Fig. 1, and

Fig. 6 is a similar view taken on the line 6—6 of Fig. 1.

In the embodiment illustrated, a standard 1 is shown composed of a plurality of detachably connected sections 2 and 3 which have threaded engagement at their meeting ends, section 2 being smaller than section 3 to provide a shoulder 3ª at the upper end of said section 3, which forms a rest for a T-shaped coupling 4 mounted on section 2 to swing in a horizontal plane and from the shank of which extends a supporting arm 5 for a purpose presently to be described.

The section 3 is composed of two fixedly connected members 6 and 7 united by a two way coupling 8, section 7 being pointed at its lower end as shown at 9 to facilitate its entrance into a supporting surface such as the earth. Carried by the two way coupling 8 and extending at right angles are two arms 10 and 11 having depending spurs 12 at their free ends which are designed to engage the support in which the standard is mounted to prevent the lower section 3 against turning in its support.

The upper section 2 has detachably mounted in its upper end, a reduced extension or nipple 13, here shown threaded into the section 2 and on which is mounted to rotate a T-shaped coupling 15 which rests on a shoulder 14 formed at the upper end of section 2.

Carried by the coupling 15 is a laterally extending vessel supporting arm 16 composed of telescopically engaged members 17 and 18, the member 17 being in the form of a tube, while the member 18 is in the form of a rod for entrance in said tube and has an upwardly opening hook 19 formed at its outer end to support a bail of a vessel such as a bucket, kettle or the like. The rod 18, at a point midway its ends, has laterally extending oppositely disposed lugs 18ª while the outer end of the tubular member 17 has an inturned flange equipped with diametrically opposite notches 7ª to provide for the entrance of the lugs on the member 18 which hold said member in assembled position against accidental withdrawal. It will be obvious that to insert the member 18, it will be necessary to bring the lugs 18ª into register with the notches 17ª before member 18 can enter member 17, and after such entrance, the rod 18 will be turned sufficiently to position the lugs for engagement with the flange of the tube 17 holding the two members against accidental separation.

Mounted in the upper end of the nipple 13 to swing in a horizontal plane is an arm 20 in the form of a rod having a right angular finger 21 at its inner end which is adapted to be inserted in said nipple 13 and to turn freely therein. This arm 20 is equipped with a plurality of longitudinally spaced notches 22 which are designed to receive articles to be supported thereby and prevent them from slipping off the arm.

Carried by arm 5 at the free end thereof, is a T coupling 23, the shank thereof being connected with arm 5 and the head disposed vertically to receive a bolt 24 which connects to the coupling a pair of pivoted laterally extending pan supporting arms 25 and 26, the inner ends of which are flattened and apertured, being arranged in superposed relation to receive bolt 24. The arms 25 and 26 are provided at their outer free ends with upstanding fingers 28 designed to form rests for the bottom of a pan P, to be supported thereby.

A plate or metal strip 29 is carried by the bolt 24 near the lower end of the coupling 23 and the flat head 27 of arm 26, and operates to limit the opening movement of the arms 25 and 26, being provided with depending ears 30 for this purpose. These ears 30 engage the outer edges of the heads of the arms 25 and 26 when swung to their extreme limit, as shown in Fig. 2, to prevent the arms from swinging out from under the pan being supported thereby. The upper face of plate 29 at its rear edge between the lugs 30 has an upstanding lip 31 which is designed to enter a recess 32 formed in the lower edge of the head of the coupling 23, whereby the plate is held against turning relatively thereto. Mounted on the bolt 24 above the coupling 23 is a lock nut 24$^b$ which is designed to hold the members just described in operative position.

A pan clamping member is also carried by arm 5 and comprises a plate 34 having one end bifurcated, and the furcations 35 and 36 thereof, bent downwardly to receive between them, an upstanding lug 33 carried by arm 5 and pintle 33$^a$ passing through said furcations and lug as is shown clearly in Fig. 1.

The plate 34 is longitudinally slotted as shown at 37 to receive the bolt 24 which has a thumb nut 24$^b$ mounted thereon over said plate, which is designed to be adjusted to vary the vertical position of the plate for a purpose presently to be described. The front or outer end of the plate 34 is bent downwardly and inclined outwardly to form a clamping lip or jaw 38 with which cooperates a jaw 39 fixedly mounted on the lower face of the plate 34 at a point spaced inwardly from lip 38, and which is of a length considerably greater than said lip. These members 38 and 39 are designed to receive between them the upper edge of the frying pan P as is shown clearly in Fig. 1, the plate being adjustable to vary the clamping action on the pan and to adapt it to be used in connection with pans of different heights, the bottom of the pan resting on the fingers 28 of arm 26, whereby a three point suspension is provided for the pan.

A plate spring 40 has one end fixedly secured to the lower face of plate 34 adjacent the slot 37 therein and is bowed as shown at 41 with its other end bent at right angles and inserted in a slot formed in the shank of the coupling 23. This spring 40 operates to normally lift plate 24 and when the wing nut 24$^b$ is secured down, the plate will be forced against the tension of the spring.

From the above description it will be obvious that the cooker herein shown and described, may be readily taken apart when not in use and stored in comparatively small space, and when desired for use may be quickly set up by simply screwing section 2 into section 3 and the arms 10 and 11 into coupling 8, then placing the head or coupling 4 over section 2 and the head of the coupling 15 over the nipple 13, then inserting the rod 20 in said nipple and the device is ready for use, it being understood of course, that the sharpened portion of the ground section 7 is driven into the earth, or other support after the arms 10 and 11 have been mounted thereon, so that the apparatus will be held securely in operative position against turning.

I claim:—

1. In a device of the class described, a standard having support engaging means and means to hold it against turning relative to its support, a laterally extending arm carried by said standard and having clamping jaws, and a pan rest to form a three point suspension means for a pan.

2. A device of the class described comprising a standard composed of a plurality of sections detachably connected, an arm mounted to swing laterally on said standard having a T head on its outer end, a pair of pivoted arms carried by said head, means for limiting the opening movement of said arms, said arms having upturned fingers at their free ends, and a clamp mounted above said pivoted arms adjacent the inner end thereof to cooperate therewith to support a pan in operative position.

3. A device of the class described comprising a standard having a laterally extending arm mounted thereon, pan supporting arms carried by said first mentioned arm and pivoted to swing toward and away from each other, a plate having downturned lugs to limit the opening movement of said swinging arms and a resiliently mounted plate having a pan clamp for cooperation with said swinging arms to hold a pan supported thereby.

In testimony that I claim the foregoing as my own, I have hereto affixed my signature in the presence of two witnesses.

SAMUEL C. HULICK.

Witnesses:
RICHARD MARSH,
GEORGE R. TEEPLE.